United States Patent [19]

Davis

[11] Patent Number: 4,485,871
[45] Date of Patent: Dec. 4, 1984

[54] IN-SITU PROCESS FOR RECOVERING HYDROCARBONS FROM A DIATOMITE-TYPE FORMATION

[75] Inventor: Bruce W. Davis, Fullerton, Calif.

[73] Assignee: Chevron Research Company, San Francisco, Calif.

[21] Appl. No.: 473,510

[22] Filed: Mar. 9, 1983

[51] Int. Cl.$^3$ .................... E21B 43/22; E21B 43/24; E21B 43/40
[52] U.S. Cl. .................... 166/266; 166/271; 166/272; 166/273
[58] Field of Search ............... 166/273, 274, 266, 272, 166/245, 270; 208/11 LE

[56] References Cited

U.S. PATENT DOCUMENTS

| | | | |
|---|---|---|---|
| 2,920,041 | 1/1960 | Meadors | 166/274 X |
| 3,033,288 | 5/1962 | Holm | 166/273 |
| 3,236,306 | 2/1966 | Atwood et al. | 166/273 X |
| 3,288,215 | 11/1966 | Townsend et al. | 166/273 X |
| 3,493,051 | 2/1970 | Gogarty | 166/274 |
| 3,637,018 | 1/1972 | Kelly et al. | 166/273 X |
| 4,167,470 | 9/1979 | Karnofsky | 208/8 LE |
| 4,374,023 | 2/1983 | Davis | 208/11 LE |

FOREIGN PATENT DOCUMENTS 692073 8/1964 Canada ................ 166/272

OTHER PUBLICATIONS

Farouq Ali, "Application of Solvent Slugs in Thermal Recovery Operations", *Producers Monthly*, Jul. 1965, vol. 29, No. 7, pp. 6–9.

*Primary Examiner*—Stephen J. Novosad
*Attorney, Agent, or Firm*—S. R. LaPaglia; E. J. Keeling; A. Stephen Zavell

[57] ABSTRACT

An in-situ process for recovering hydrocarbons from a diatomite-type formation which comprises contacting the diatomite formation with a $C_4$–$C_{10}$ alcohol and thereafter displacing the hydrocarbon-alcohol mixture with an aqueous alkaline solution towards a production well. The aqueous alkaline solution can be displaced with additional solution or another suitable medium such as a connate water drive.

20 Claims, No Drawings

IN-SITU PROCESS FOR RECOVERING HYDROCARBONS FROM A DIATOMITE-TYPE FORMATION

BACKGROUND OF THE INVENTION

The present invention relates to a process of extracting hydrocarbons from a diatomite formation. More specifically, the present invention relates to the in-situ recovery of hydrocarbons from a diatomite hydrocarbon-rich formation.

Diatomite-hydrocarbon formations and similar materials are different from the vast majority of grainy or tar sand-like formations. Diatomite formations are composed of hollow siliceous skeletons of single-celled animals referred to as "diatoms." A diatomite-like material is defined as a material which has a surface area and structure which is substantially similar to diatomaceous earth such as porcellanite and the like. In ocean sediments, hydrocarbon-rich diatomaceous earth is sometimes referred to as "diatom ooze" which is normally found at a depth of about 500 fathoms and comprises the empty shells of diatoms. The porous structure and extremely high surface area of diatomaceous earth makes extraction and recovery of the hydrocarbons difficult. Hydrocarbon rich diatomite is sometimes classified as a tar sand, i.e., a sand cemented by a bitumen too viscous to be recovered by conventional crude oil production methods.

The properties of the material preclude the application of most surface hydrocarbon solvent or hot waterflood techniques in-situ. Solvents which displace the hydrocarbons tend to be trapped in the diatomaceous earth structure, thus rendering recovery uneconomical. Steam or aqueous hot-wash floods have difficulty reaching the surface of the diatoms in the formation to remove the hydrocarbons therefrom. Also, steam and water drives tend to have poor injectivity. In addition, the water drives may swell the formation and substantially reduce its permeability or plug the formation. Alternatively, surface processing methods require strip mining. The strip mining is often environmentally unacceptable. The surface methods also have disposal problems with the spent material.

Thus, it would be highly desirable to have a process which can extract in-situ the hydrocarbons from the diatomaceous formation without entraining diatoms in the extracted hydrocarbons and swelling or plugging the formation. It would also be desirable to have a flood material which can easily be separated from the produced hydrocarbons for re-injection.

SUMMARY OF THE INVENTION

I have invented an in-situ process for recovering hydrocarbons from diatomaceous-like formations penetrated by at least one injection well and at least one production well. A sufficient amount of a $C_4$–$C_{10}$ alcohol or mixture of alcohols is injected into the formation to form a hydrocarbon-alcohol phase which is recovered at a production well. Following the alcohol injection, an aqueous alkaline solution is injected into the formation and displaced towards the production well. The hydrocarbon-alcohol phase is displaced by the aqueous alkaline solution and recovered from the production well. The aqueous alkaline phase can be displaced by an aqueous alkaline drive fluid or other suitably conditioned displacement medium.

DETAILED DESCRIPTION OF THE INVENTION

The diatomite formation containing hydrocarbons is injected with a sufficient amount of a $C_4$–$C_{10}$ alcohol to form a hydrocarbon-alcohol phase. If necessary, the formation is treated to create a zone of increased permeability between an injection well and a production well. The zone can be created by fracturing with gas, explosives, and the like. Suitable techniques are taught in U.S. Pat. No. 3,842,910; 3,954,624; and 3,765,488 incorporated herein by reference. Preferably, the zone is created by injecting a sufficient amount of the alcohol under sufficient pressure to fracture the formation. Optionally, the alcohol can incorporate known gelling agents and proppant materials.

The injection and production wells can be arranged in any pattern. For example, a two-spot, a three-spot, a regular four-spot, a skewed four-spot, a five-spot, a seven-spot, an inverted seven-spot, and the like. Suitable patterns are described in The Reservoir Engineering Aspects of Waterflooding by Forrest F. Craig, Jr., Society of Petroleum Engineers of AIME, 1971, page 49, incorporated herein by reference. Preferably, the injection well is surrounded by production wells, i.e., regular four-spot and five-spot patterns.

The alcohols are selected such that the alcohols are slightly soluble or insoluble in water, but still capable of fracturing the formation and solubilizing the hydrocarbon in the diatomaceous formation. The alcohol is preferably used at a temperature above about 20° C. and most preferably above about 32° C. A suitable temperature range is from about 20° C. to about 95° C. The alcohol injection is continued until the desired amount of alcohol is in the formation. The alcohols are preferred over standard water based fracturing because they will not plug the formation.

The $C_4$–$C_{10}$ alcohol can be a straight- or branched-chain aliphatic such as n-butanol, 1-butanol, 1-, 2-, or 3-pentanol, t-butanol, 1-, 2-, 3-, or 4-heptanol, and the like; an aromatic such as phenylcarbinol, ortho, meta and/or para tolyl carbinol, methylphenylcarbinol, dimethylphenylcarbinol, and the like; an alicyclic such as cyclohexanol, cyclopentanol, and the like; an alicyclic alcohol substituted with a straight- or branched-chain alkyl group wherein the OH group is either on the ring or the alkyl group such as 2 methyl-cyclohexanol, 2 cyclohexylethanol, and the like; an aromatic-alicyclic substituted with an aliphatic group in either ring such as

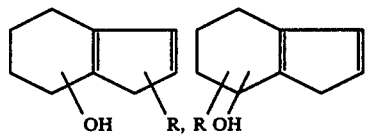

where R is methyl; an unsaturated straight- or branched-chain alcohol such as but-1-en-4-ol, 4-penten-1-ol, 5-methyl-3-hexen-1-ol, and the like; and mixtures thereof. Other examples include α-, β-, or γ-terpineol. In terms of preferred aliphatic alcohols, n-butanol is more preferred than isobutanol which is more preferred than t-butanol. Most preferred is n-hexanol, n-heptanol or n-octanol.

"A sufficient amount of alcohol" is defined to mean that amount of alcohol which can fracture the diatomite formation and/or wet a sufficient portion of the formation such that a hydrocarbon-alcohol phase can be produced at a production well when displaced by a displacing fluid. After the alcohol is injected, it is displaced towards a production well. Preferably, the alcohol injection is continued until a hydrocarbon-alcohol phase is produced at a production well after displacement. Optionally, the alcohol can be permitted to soak in the formation prior to displacement. With respect to the wetting of the diatomaceous formation, the ratio of alcohol to diatomaceous material in the formation is from about 1 to 1 to about 1 to 5 and most preferably 4 to 5. Generally, the alcohol is injected in an amount of from about 0.1 pore volume to about 1.0 pore volume.

Thereafter, an aqueous alkaline solution is injected at the injection well. The aqueous alkaline solution is displaced towards the production well. Sufficient aqueous alkaline solution is injected to separate the hydrocarbon from the diatomaceous formation. A sufficient amount is from about 0.1 to about 1.5 pore volumes and most preferably equal to or greater than 0.4 pore volumes. Preferably, the aqueous alkaline solution is displaced by aqueous polymer solution or other suitable drive fluid such as a greater amount of the aqueous alkaline solution. Alternatively, the solution can be displaced by a steam or water drive. The formation may need pretreatment with appropriate additives to prevent plugging of the formation. A suitable additive is hydroxy-aluminum. However, this may be unnecessary if heavy ends in the petroleum serve the same function. Another alternative is an aqueous polymer solution such as hydroxyethylcellulose and water, xanthan gum and water, or polyacrylamide and water. The displacement can also be an aqueous alkaline polymer solution.

Any aqueous alkaline solution produced at the production well can be separated and re-injected. The separation occurs readily at room temperature. Preferably, the solution temperature is from about 20° C. to 95° C., and most preferably 32° C. or higher. The alcohols can be separated from the hydrocarbons by means known in the art and also re-injected. For example, see U.S. Pat. No. 4,374,023, incorporated herein by reference for all purposes.

The contacting of the aqueous alkaline solution to the alcohol-wet diatomite formation causes a separation of the hydrocarbons from the diatomite formation. The hydrocarbon-alcohols are recovered at the production well. Aqueous alkaline is defined as a solution with a pH which is at least a pH of about 9, and preferably greater than 11, and most preferably about 13. Any suitable compound which can raise the pH to the preferred range, such as condensed silicates or phosphates, NaOH or other hydroxides, is within the scope of the invention. The hydroxide is present in an amount in excess of about 1 g per 100 ml and preferably about 2 g per 100 ml.

Condensed silicates and phosphates are preferred and most preferred are the alkali metal silicates and phosphates. A preferred range of sodium meta-silicate is from 1.5 percent to 4.5 percent. A most preferred embodiment is where the aqueous alkaline solution contains 3 percent sodium meta-silicate ($Na_2SiO_3$). A preferred ranged of sodium pyrophosphate is from about 2 percent to 10 percent. A most preferred concentration range is from about 3 percent to about 5 percent sodium tetrapyrophosphate ($Na_4P_2O_7$). Condensed silicates or phosphates are defined as compounds or polymers of silicates or phosphates known as polyphosphates and polysilicates as taught in Sections 28.15 and 28.16 of General Chemistry, by Paul et al, pages 653–660, and the polymer structures disclosed on page 431 of Chemistry, by Charles E. Mortimer, said material incorporated herein by reference.

Having described the process, the invention will be more clearly illustrated by referring to the following examples. It should be understood that the examples are illustrative only and not intended to limit the scope of the invention. Modifications which would be obvious to one of ordinary skill in the art are contemplated to be within the scope of the invention.

EXAMPLES

EXAMPLE 1

Injection wells and production wells are drilled into a diatomaceous formation in a five-spot pattern. The formation has a porosity of about 48 percent and contains about 12 percent oil. This corresponds to an oil saturation of about 43 percent for a 13° API oil. About 0.5 pore volumes of n-hexanol is injected towards the corner production wells at the injection well. Thereafter, about 0.5 pore volumes of 3 percent sodium metasilicate ($Na_2SiO_3$) is injected towards the production wells at the injection well. During this period, hydrocarbons and thereafter hydrocarbons and alcohols are produced at the production wells. The production is continued until the $Na_2SiO_3$ phase breaks through at the production well.

EXAMPLE 2

The procedure according to Example 1 is followed except that the $Na_2SiO_3$ is displaced towards the production by an aqueous drive conditioned to prevent formation plugging.

EXAMPLE 3

The procedure of Example 1 is followed except 3 percent $Na_4P_2O_7$ is substituted for 3 percent $Na_2SiO_3$.

EXAMPLE 4

The procedure of Example 1 is followed except that the alcohol is injected at sufficient pressure to fracture the formation and increase the permeability of the formation between the injection well and the production wells.

EXAMPLE 5

The procedure of Examples 1 and 4 are followed except that the 3 percent $Na_2SiO_3$ is displaced towards the production well by a steam drive.

EXAMPLE 6

A core from a diatomaceous formation is fashioned into a rectangular parallelopiped, 1"×1"×3". Such a core has a total volume of about 49 cc. A core having a porosity of about 52 percent corresponds to about 26 cc of pore volume. The 26 cc represents an upper limit of volume accessible to fluids. Maintaining the core at 32° C., the core is saturated with connate water so that there is no dead air space. Then, 13 cc (½ pore volume) of n-hexanol is injected, followed by 26 cc of 3 percent $Na_2SiO_3$ (1 pore volume). This is subsequently followed by 13 cc (½ pore volume) of connate water to displace the hydrocarbon-alcohol phase and the aqueous alkaline solution towards the recovery end of the core. A total of 2 pore volumes of fluid injected to recover the hydrocarbons. Production of fluids, i.e., oil/alcohol and aqueous alkaline solution is monitored as a function of time.

I claim:

1. An in-situ sequential process for recovering hydrocarbons from a diatomite formation comprising:
   (a) injecting a sufficient amount of a slightly soluble in water or insoluble in water $C_4-C_{10}$ alcohol or mixture of alcohols at an injection well to produce a hydrocarbon-alcohol phase at a production well; thereafter,
   (b) injecting an aqueous alkaline solution into said formation at said injection well; thereafter,
   (c) displacing said aqueous alkaline solution towards said production well; thereafter, and
   (d) recovering hydrocarbons from the production well.

2. The process according to claim 1 wherein the $C_4-C_{10}$ alcohol is a $C_4-C_{10}$ straight- or branched-chain aliphatic, alicyclic, aromatic, substituted aromatic, substitued alicyclic, aromatic-alicyclic, olefinic, or mixtures thereof.

3. The process according to claim 2 wherein the alcohol is a straight-chain or a branched-chain alcohol.

4. The process according to claim 3 wherein the alcohol is a straight-chain $C_4-C_{10}$ alcohol.

5. The process according to claim 2 wherein the alcohol is injected in an amount of from about 0.1 to about 1.0 pore volumes.

6. The process according to claim 5 wherein said alcohol is heated to from about 20° C. to about 95° C.

7. The process according to claim 6 wherein the aqueous alkaline solution has a pH greater than about pH 9.

8. The process according to claim 7 wherein the pH is obtained by adding a condensed silicate, a condensed phosphate, a hydroxide, an alkali metal silicate, or mixtures thereof, to an aqueous solution.

9. The process according to claim 8 wherein said aqueous alkaline solution is injected in an amount of from about 0.1 to about 1.5 pore volumes of said diatomaceous formation.

10. The process according to claim 9 wherein the aqueous alkaline solution contains from about 1.5 percent to about 4.5 percent sodium meta-silicate.

11. The process according to claim 9 wherein the aqueous alkaline solution contains from about 2 percent to about 10 percent sodium tetrapyrophosphate.

12. The process according to claim 9 wherein the aqueous alkaline solution has a temperature of from about 20° C. to about 95° C.

13. The process according to claim 9 wherein the alcohol is permitted to soak into the formation after injection and prior to the injection of the aqueous alkaline solution.

14. The process according to claim 13 wherein the said aqueous alkaline solution is displaced towards said production well with additional aqueous alkaline solution.

15. The process according to claim 13 wherein said aqueous alkaline solution is displaced towards said production well by a suitable steam drive.

16. The process according to claim 13 wherein a zone of increased permeability is created by fracturing said formation with said $C_4-C_{10}$ alcohol.

17. The process according to claim 16 wherein said produced hydrocarbon-alcohol phase is separated and said alcohol is re-injected into a different injection well.

18. The process according to claim 1 which further comprises creating a zone of increased permeability between an injection well and a production well.

19. An in-situ process for recovering hydrocarbons from a diatomite formation comprising:
   (a) injecting a sufficient amount of a $C_4-C_{10}$ alcohol or mixture of alcohols at an injection well to produce a hydrocarbon-alcohol phase at a production well;
   (b) injecting an aqueous alkaline solution into said formation at said injection well, said solution contains from about 2 percent to about 10 percent sodium tetrapyrophosphate;
   (c) displacing said aqueous alkaline solution towards said production well; and
   (d) recovering the hydrocarbons from the production well.

20. The process according to claim 19 which further comprises creating a zone of increased permeability between an injection well and a production well.

* * * * *